(12) United States Patent
Sugiura et al.

(10) Patent No.: US 7,569,301 B2
(45) Date of Patent: Aug. 4, 2009

(54) FUEL CELL

(75) Inventors: Seiji Sugiura, Utsunomiya (JP); Shuhei Goto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 756 days.

(21) Appl. No.: 11/058,009

(22) Filed: Feb. 15, 2005

(65) Prior Publication Data
US 2005/0186459 A1 Aug. 25, 2005

(30) Foreign Application Priority Data
Feb. 19, 2004 (JP) .............................. 2004-042761

(51) Int. Cl.
H01M 2/00 (2006.01)
H01M 2/02 (2006.01)
H01M 2/14 (2006.01)
(52) U.S. Cl. .............................. 429/39; 429/38; 429/34
(58) Field of Classification Search .................. 429/39, 429/38, 34
See application file for complete search history.

(56) References Cited

U.S. PATENT DOCUMENTS

| 6,261,710 B1 * | 7/2001 | Marianowski ............... 429/34 |
| 7,022,430 B2 * | 4/2006 | Enjoji et al. .................. 429/39 |

FOREIGN PATENT DOCUMENTS

| JP | 08-180883 | 7/1996 |
| JP | 2002-151097 | 5/2002 |

* cited by examiner

Primary Examiner—Patrick Ryan
Assistant Examiner—Julian Mercado
(74) Attorney, Agent, or Firm—Fish & Richardson P.C.

(57) ABSTRACT

A fuel cell includes a membrane electrode assembly and separators sandwiching the membrane electrode assembly. Each of the separators includes first and second metal plates. When the fist and second metal plates are stacked together, an inlet buffer and an outlet buffer are overlapped with each other in the stacking direction. A plurality of bosses in the inlet buffer and a plurality of bosses in the outlet buffer are not overlapped with each other.

9 Claims, 12 Drawing Sheets ated. Therefore, the flow
FUEL CELL

BACKGROUND OF THE INVENTION

1. Field of the Invention

The present invention relates to a fuel cell formed by stacking an electrolyte electrode assembly and separators alternately in a stacking direction. The electrolyte electrode assembly includes a pair of electrodes and an electrolyte interposed between the electrodes. Reactant gas passages and coolant passages extend through the fuel cell in the stacking direction.

2. Description of the Related Art

For example, a solid polymer electrolyte fuel cell employs a polymer ion exchange membrane as a solid polymer electrolyte membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell. In use, generally, a predetermined number of the fuel cells are stacked together to form a fuel cell stack.

In the fuel cell, a fuel gas (reactant gas) such as a gas chiefly containing hydrogen (hereinafter also referred to as the hydrogen-containing gas) is supplied to the anode. An oxidizing gas (reactant gas) such as a gas chiefly containing oxygen (hereinafter also referred to as the oxygen-containing gas) is supplied to the cathode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electrical energy. At the cathode, the hydrogen ions from the anode combine with the electrons and oxygen to produce water.

In the fuel cell, a fuel gas flow field is formed on the separator facing the anode for supplying the fuel gas to the anode. An oxygen-containing gas flow field is formed on the separator facing the cathode for supplying the oxygen-containing gas to the cathode. Further, a coolant flow field is provided between the anode side separator and the cathode side separator such that a coolant flows along the surfaces of the separators.

Normally, the separators of this type are formed of carbon material. However, it has been found that it is not possible to produce a thin separator using the carbon material due to factors such as the strength. Therefore, recently, attempts to reduce the overall size and weight of the fuel cell using a separator formed of a thin metal plate (hereinafter also referred as the metal separator) have been made. In comparison with the carbon separator, the metal separator has the higher strength, and it is possible to produce a thin metal separator easily. The desired reactant flow field can be formed on the metal separator by press forming to achieve reduction in the thickness of the metal separator, and reduce the overall size and weight of the fuel cell.

However, in the case the thin metal plate is formed into the metal separator having the reactant gas flow field fabricated by press forming, the reactant gas flow field and the coolant flow field are formed on both surfaces of the metal separator. That is, the shape of the coolant flow field is determined inevitably based on the shape of the reactant gas flow field. In particular, in order to achieve the long grooves, assuming that the reactant gas flow field comprises serpentine flow grooves extending along the electrode surface, the shape of the coolant flow field is significantly constrained. Therefore, the flow rate of the coolant in the electrode surface is not uniform.

For example, a solid polymer electrolyte fuel cell disclosed in Japanese Laid-Open Patent Publication 8-180883 is known. The fuel cell is directed to achieve the required cross sectional area in each of the reactant gas flow field and the coolant flow field. As shown in FIG. 12, the fuel cell 1 is sandwiched between separators 2. The fuel cell 1 includes an electrolyte membrane 3 and electrode 4a, 4b formed on both surfaces of the electrolyte membrane 3.

On the surfaces of the separators 2 which face each other, support bodies 6a, 6b forming reactant gas flow fields 5a, 5b between the electrode membranes 4a, 4b and the separators 2 are provided. On the surfaces of the separators 2 which are stacked together, support bodies 7 are provided. The support bodies 7 abut against each other to form a coolant flow field 8. The coolant flow field 8 is connected to bridges 8a provided near a coolant inlet and a coolant outlet. Buffers 9 are provided on opposite sides of the electrode membranes 4a, 4b.

However, in the buffers 9, buffers of three kinds of fluid, i.e., an oxygen-containing gas, a fuel gas, and a coolant are overlapped with each other in the stacking direction. Therefore, when the thickness of the fuel cell is thin, the desired height of the flow field is not achieved in the buffers 9. Thus, in the buffers 9, the oxygen-containing gas, the fuel gas, and the coolant are not distributed smoothly in the respective flow grooves.

SUMMARY OF THE INVENTION

A main object of the present invention is to provide a fuel cell with a simple structure in which the required cross sectional is achieved in a reactant gas flow field and a coolant flow field, and a uniform tightening load is applied to the fuel cell.

According to the present invention, a fuel cell is formed by stacking an electrolyte electrode assembly and separators alternately in a stacking direction. The electrolyte electrode assembly includes a pair of electrodes and an electrolyte interposed between the electrodes. A reactant gas passage and a coolant passage extend through the fuel cell in the stacking direction.

Each of the separators includes at least first and second metal plates stacked together. Each of the first and second metal plates has a reactant gas flow field for supplying a reactant gas along a power generation surface of the electrode facing the first or second metal plate, and a coolant flow field is formed between the first and second metal plates for supplying a coolant along surfaces of the separators.

Each of the first-and second metal plates has a reactant gas buffer including bosses on one surface facing the electrode and a coolant buffer including bosses on the other surface. The reactant gas buffer is connected to the reactant gas passage and the reactant gas flow field. The coolant buffer is connected to the coolant passage and the coolant flow field. When the first and second metal plates are stacked together, the reactant gas buffer and the coolant buffer are overlapped with each other in the stacking direction, and the bosses in the reactant gas buffer and the bosses in the coolant buffer are not overlapped with each other in the stacking direction.

It is preferable that the reactant gas passage comprises an oxygen-containing gas passage and a fuel gas passage, the reactant gas flow field comprises an oxygen-containing gas flow field provided on the first metal plate for supplying an oxygen-containing gas along a power generation surface of a cathode as one of the electrodes, and a fuel gas flow field provided on the second metal plate for supplying a fuel gas along a power generation surface of an anode as the other of the electrodes, and the reactant gas buffer comprises an oxygen-containing gas buffer and a fuel gas buffer, and when the first metal plate and the second metal plate are stacked together, the oxygen-containing gas buffer and the fuel gas buffer are provided in planes of different positions in the stacking direction.

Further, it is preferable that the oxygen-containing gas passage comprises an oxygen-containing gas supply passage and an oxygen-containing gas discharge passage, the fuel gas passage comprises a fuel gas supply passage and a fuel gas discharge passage, and the coolant passage comprises a coolant supply passage and a coolant discharge passage. Further, it is preferable that the coolant buffer comprises a first inlet buffer connected to the coolant supply passage and a first outlet buffer connected to the coolant discharge passage on the first metal plate, and further comprises a second inlet buffer connected to the coolant supply passage and a second outlet buffer connected to the coolant discharge passage on the second metal plate at positions different from positions of the first inlet buffer and the first outlet buffer.

Further, it is preferable that among six passages comprising the oxygen-containing gas supply passage, the fuel gas supply passage, the coolant supply passage, the oxygen-containing gas discharge passage, the fuel gas discharge passage, and the coolant discharge passage, three passages extend through one end of the separators, and the other three passages extend through the other end of the separators. It is preferable that the coolant supply passage and the coolant discharge passage are provided at central positions of the opposite ends of the separator.

It is preferable that each of said oxygen-containing gas flow field and the fuel gas flow field comprises serpentine flow grooves. Further, it is preferable that the reactant gas passage and the reactant gas buffer are connected through a plurality of grooves, and the coolant passage and the coolant buffer are connected through a plurality of grooves. Further, it is preferable that the coolant flow field is partially defined by the first metal plate, and partially defined by the second metal plate.

According to the present invention, when the reactant gas flow field and the coolant buffer are overlapped with each other in the stacking direction, the desired height in the reactant flow field is achieved by the bosses in the reactant gas flow field, and the desired height in the coolant flow field is achieved by the bosses in the coolant flow field. Therefore, the reactant gas and the coolant flow smoothly along the reactant gas buffer and the coolant buffer, respectively.

Further, since the bosses in the reactant gas flow field and the bosses in the coolant flow field are not overlapped with each other in the stacking direction, the separator surface of the reactant gas buffer and the electrolyte electrode assembly can be supported by the bosses. Thus, the load is suitably transmitted through the bosses, and the desired tightening load is reliably applied to the fuel cell.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
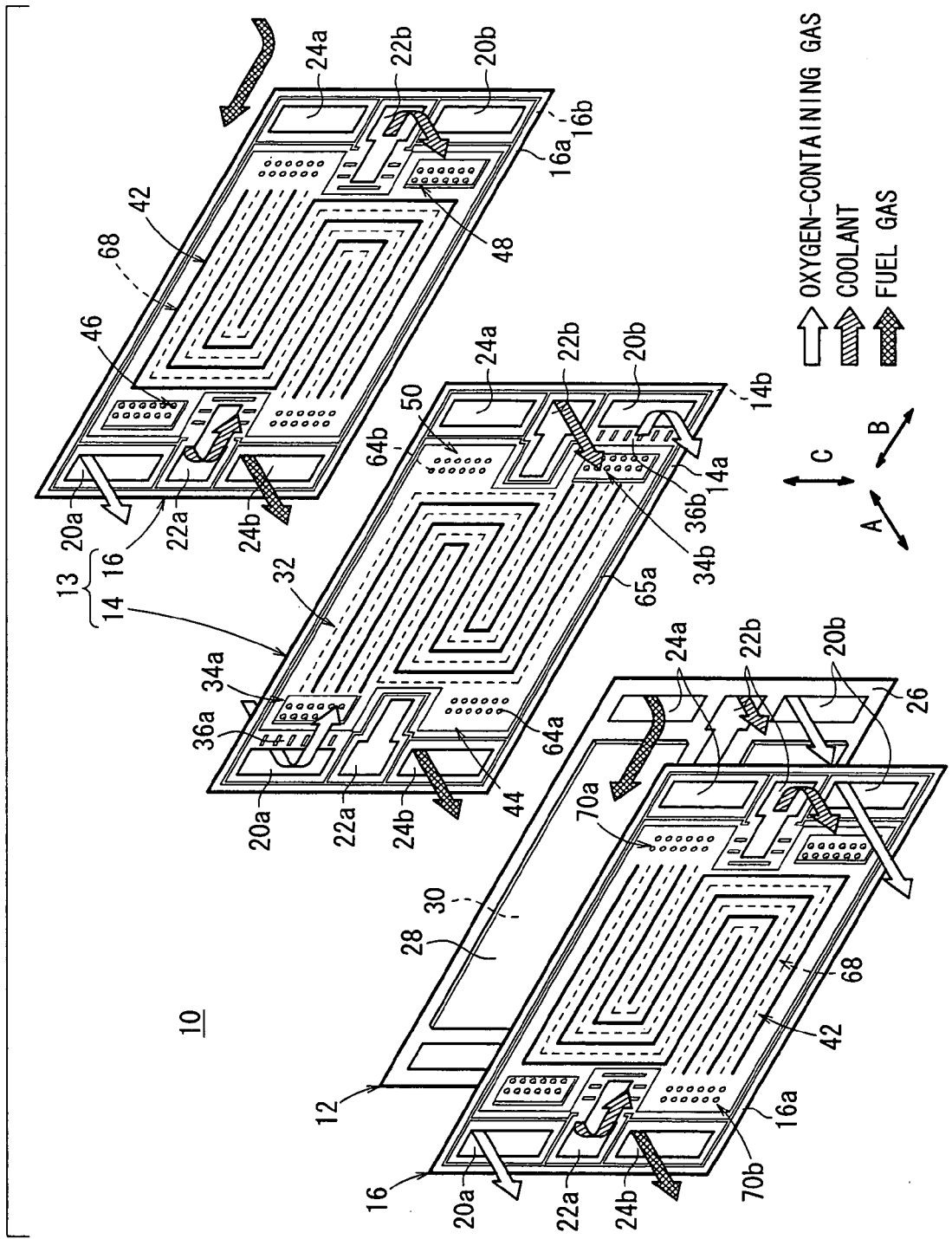
FIG. 1 is a perspective view showing main components of a fuel cell according an embodiment of the present invention.
Figure 2:
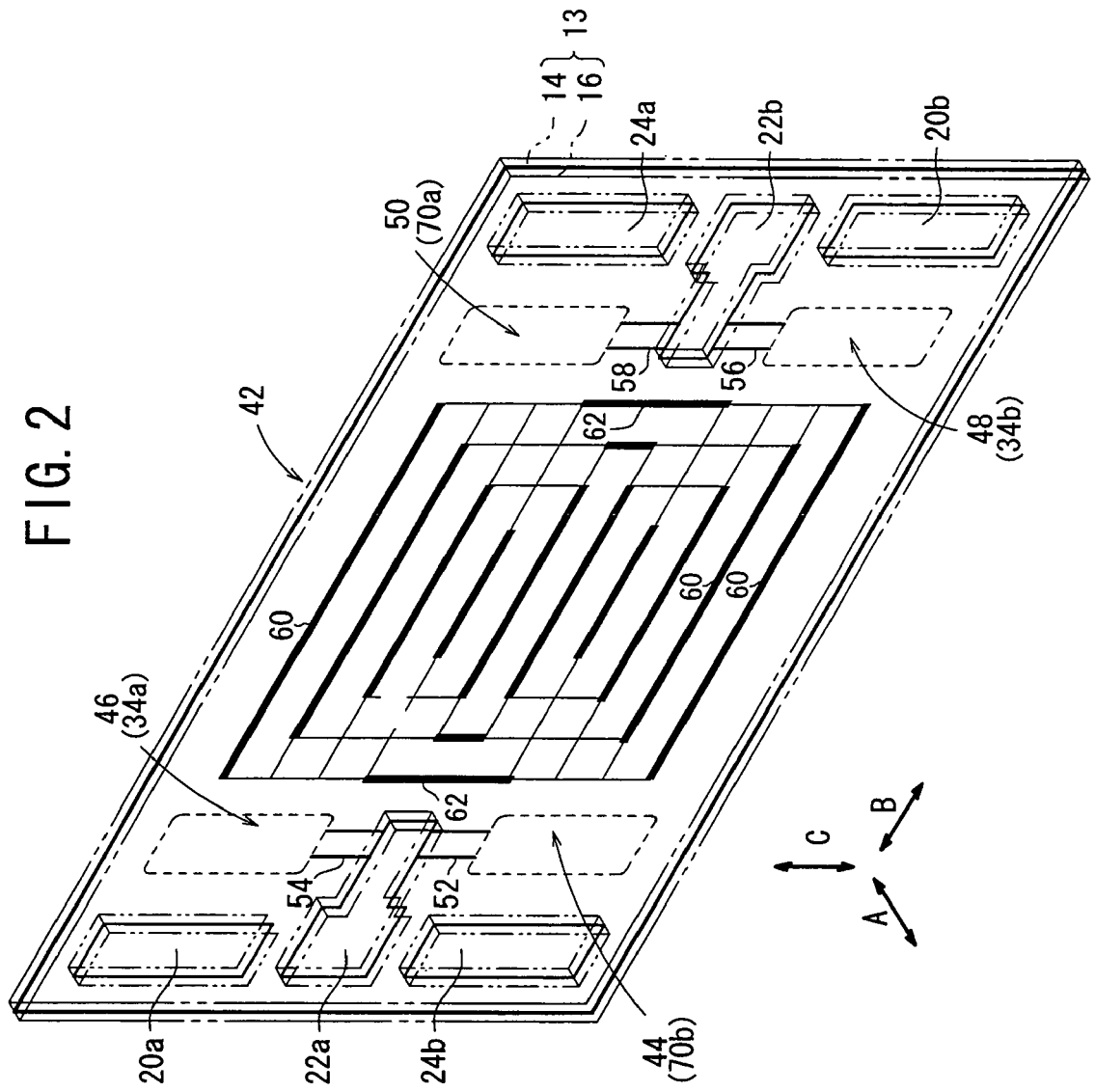
FIG. 2 is a perspective view showing a coolant flow field of the fuel cell.
Figure 3:
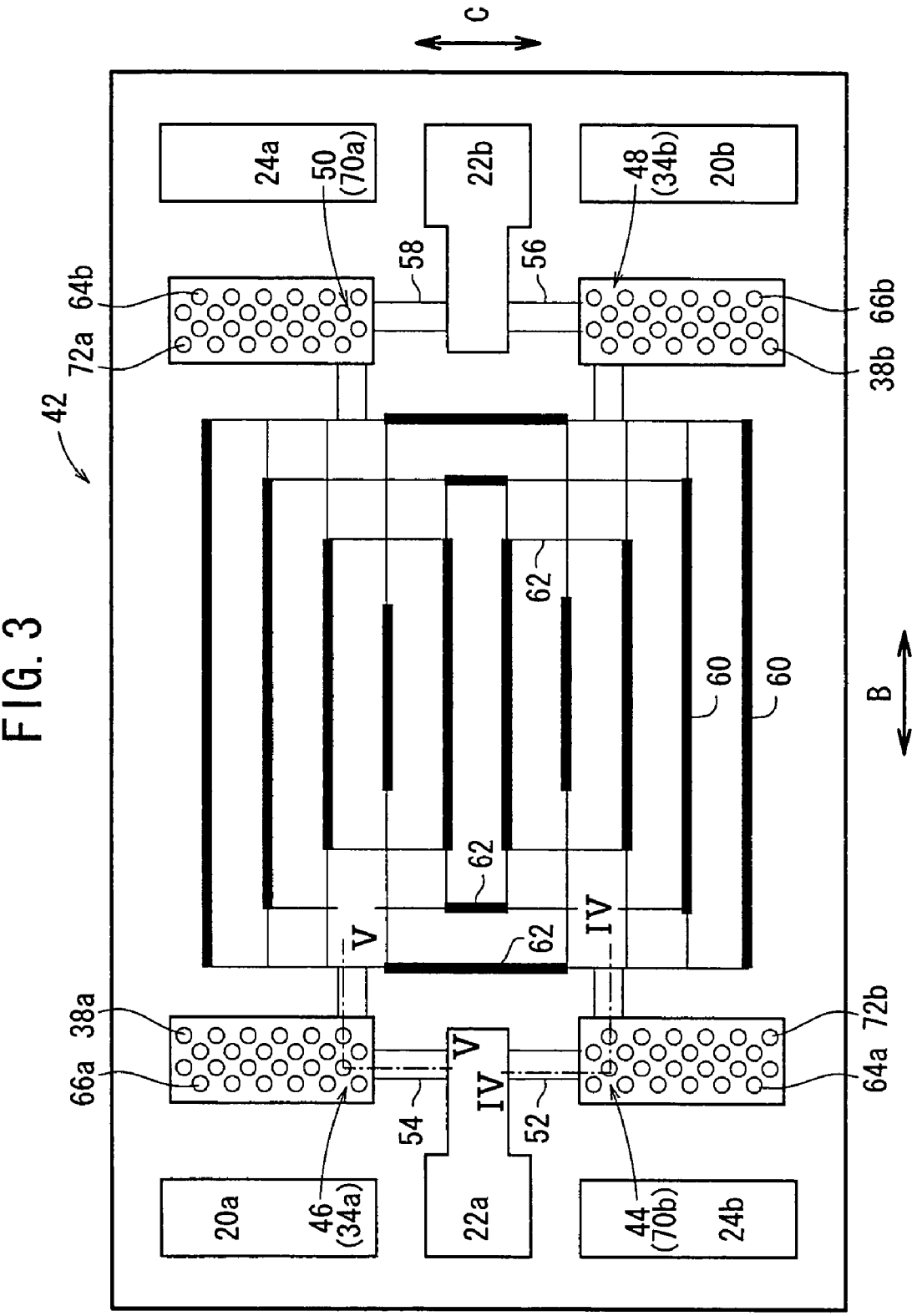
FIG. 3 is a front view showing the coolant flow field.

FIG. 1 is an exploded perspective view showing main components of a fuel cell 10 according an embodiment of the present invention. FIG. 2 is a perspective view showing a coolant flow field 42 (described later) of the fuel cell 10. FIG. 3 is a front view showing the coolant flow field 42.

The fuel cell 10 is formed by stacking a membrane electrode assembly (MEA) 12 and separators 13 alternately. Each of the separators 13 includes first and second metal plates 14, 16 which are stacked together (see FIGS. 1, 4 to 7). The separator 13 may include, e.g., three metal plates.

As shown in FIG. 1, at one end of the fuel cell 10 in a direction indicated by an arrow B, an oxygen-containing gas supply passage 20a for supplying an oxygen-containing gas, a coolant supply passage 22a for supplying a coolant, and a fuel gas discharge passage 24b for discharging a fuel gas such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in a stacking direction indicated by the arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged in the direction indicated by the arrow C. The fuel gas supply passage 24a, the coolant discharge passage 22b, and the oxygen-containing gas discharge passage 20b extend through the fuel cell 10 in the direction indicated by the arrow A.

The membrane electrode assembly 12 comprises an anode 28, a cathode 30, and a solid polymer electrolyte membrane (electrolyte) 26 interposed between the anode 28 and the cathode 30. The solid polymer electrolyte membrane 26 is formed by impregnating a thin membrane of perfluorosulfonic acid with water, for example. At opposite ends of the anode 28 and the cathode 30 in the direction directed by the arrow B, central portions of the anode 28 and the cathode 30 are cut away inwardly for providing the coolant supply passage 22a and the coolant discharge passage 22b.

Each of the anode 28 and cathode 30 has a gas diffusion layer such as a carbon paper, and an electrode catalyst layer of platinum alloy supported on carbon particles (not shown). The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

Figure 8:
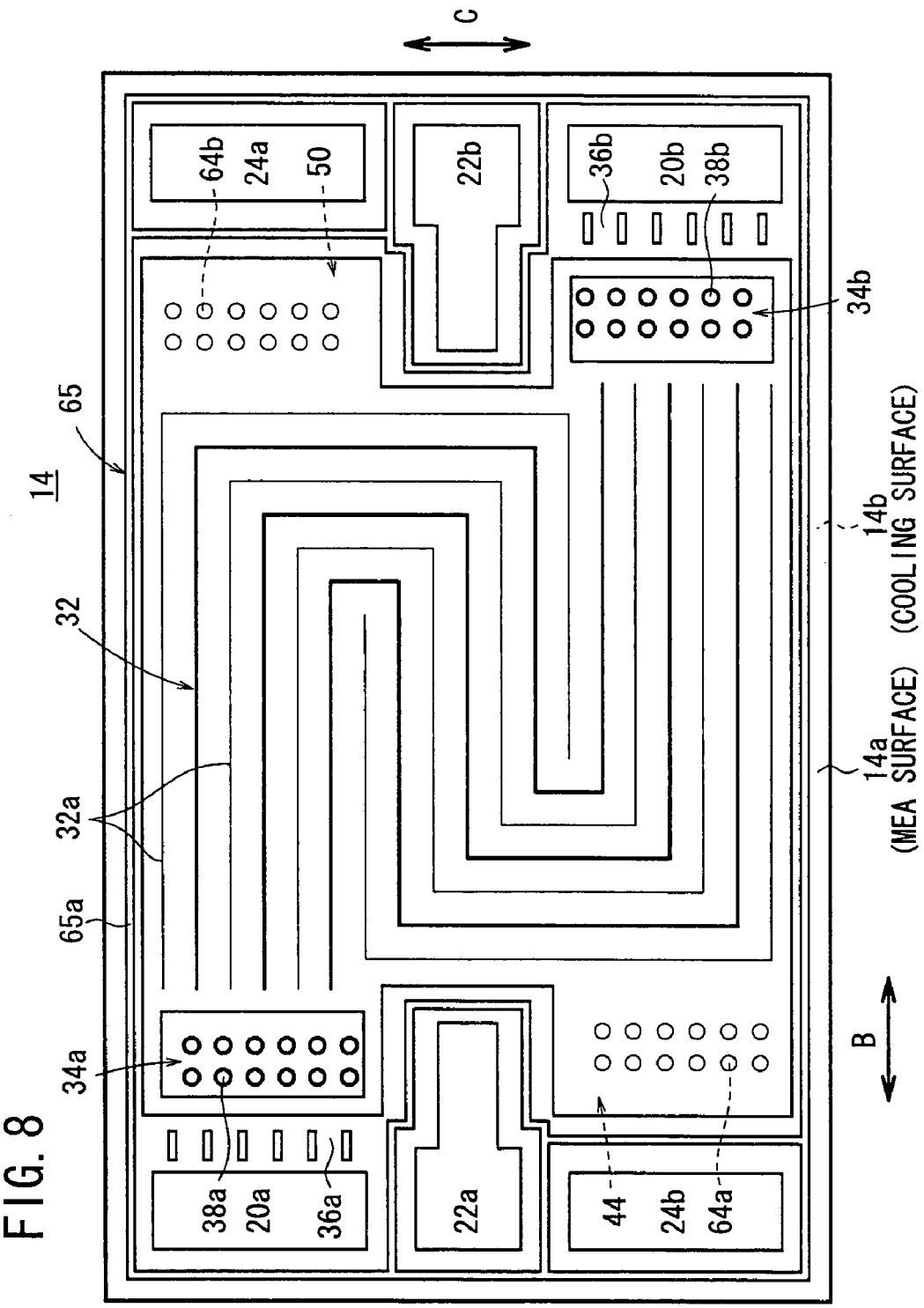
FIG. 8 is a view showing one surface of a first metal plate of the fuel cell.

As shown in FIGS. 1 and 8, the first metal plate 14 has an oxygen-containing gas flow field 32 on its surface (MEA surface) 14a facing the membrane electrode assembly 12. The oxygen-containing gas flow field 32 is connected to the oxygen-containing gas supply passage 20a at one end through an inlet buffer (oxygen-containing gas buffer) 34a provided near the oxygen-containing gas supply passage 20a, and connected to the oxygen-containing gas discharge passage 20b at the other end through an outlet buffer (oxygen-containing gas buffer) 34b provided near the oxygen-containing gas discharge passage 20b.

In the inlet buffer 34a and the outlet buffer 34b, the surface 14a is expanded toward the opposite surface 14b. The inlet buffer 34a is connected to the oxygen-containing gas supply passage 20a through a plurality of connection grooves 36a, and the outlet buffer 34b is connected to the oxygen-containing gas discharge passage 20b through a plurality of connection grooves 36b. In the inlet buffer 34a and the outlet buffer 34b, a plurality of bosses 38a, 38b protrude from the surface 14a toward the cathode 30 of the membrane electrode assembly 12 (see FIG. 5).

The inlet buffer 34a and the outlet buffer 34b are connected by a plurality of oxygen-containing gas flow grooves 32a of the oxygen-containing gas flow field 32. The oxygen-containing gas flow grooves 32a extend in a serpentine pattern for allowing the oxygen-containing gas to flow back and forth in the direction indicated by the arrow B, and flow in the direction indicated by the arrow C. Specifically, the oxygen-containing gas flow grooves 32a are serpentine grooves having two turn regions, and three straight regions extending in the direction indicated by the arrow B.

The surface 14b of the first metal plate 14 and a surface 16a of the second metal plate 16 face each other, and a coolant flow field 42 is formed between the surface 14b of the first metal plate 14 and the surface 16a of the second metal plate 16. As shown in FIGS. 2 and 3, the coolant flow field 42 is connected to, e.g., two inlet buffers (coolant buffers) 44, 46 and connected to, e.g., two outlet buffers (coolant buffers) 48, 50. The inlet buffers 44, 46 are provided near opposite ends of the coolant supply passage 22a in the direction indicated by the arrow C. The outlet buffers 48, 50 are provided near opposite ends of the coolant discharge passage 22b in the direction indicated by the arrow C.

The coolant supply passage 22a is connected to the inlet buffers 44, 46 through a plurality of inlet flow grooves (connection grooves) 52, 54. The coolant discharge passage 22b is connected to the outlet buffers 48, 50 through a plurality of outlet flow grooves (connection grooves) 56, 58.

The coolant flow field 42 comprises a plurality of straight flow grooves 60 extending in the direction indicated by the arrow B, and a plurality of straight flow grooves 62 extending in the direction indicated by the arrow C. The straight flow grooves 60 are spaced from each other at predetermined intervals in the direction indicated by the arrow C. The straight flow grooves 62 are spaced from each other at predetermined intervals in the direction indicated by the arrow C. The coolant flow field 42 is partially defined by grooves on the surface 14b of the first metal plate 14, and partially defined by grooves on the surface 16a of the second metal plate 16. The coolant flow field 42 is formed between the first metal plate 14 and the second metal plate 16 when the first metal plate 14 and the second metal plate 16 are stacked together.

Figure 9:
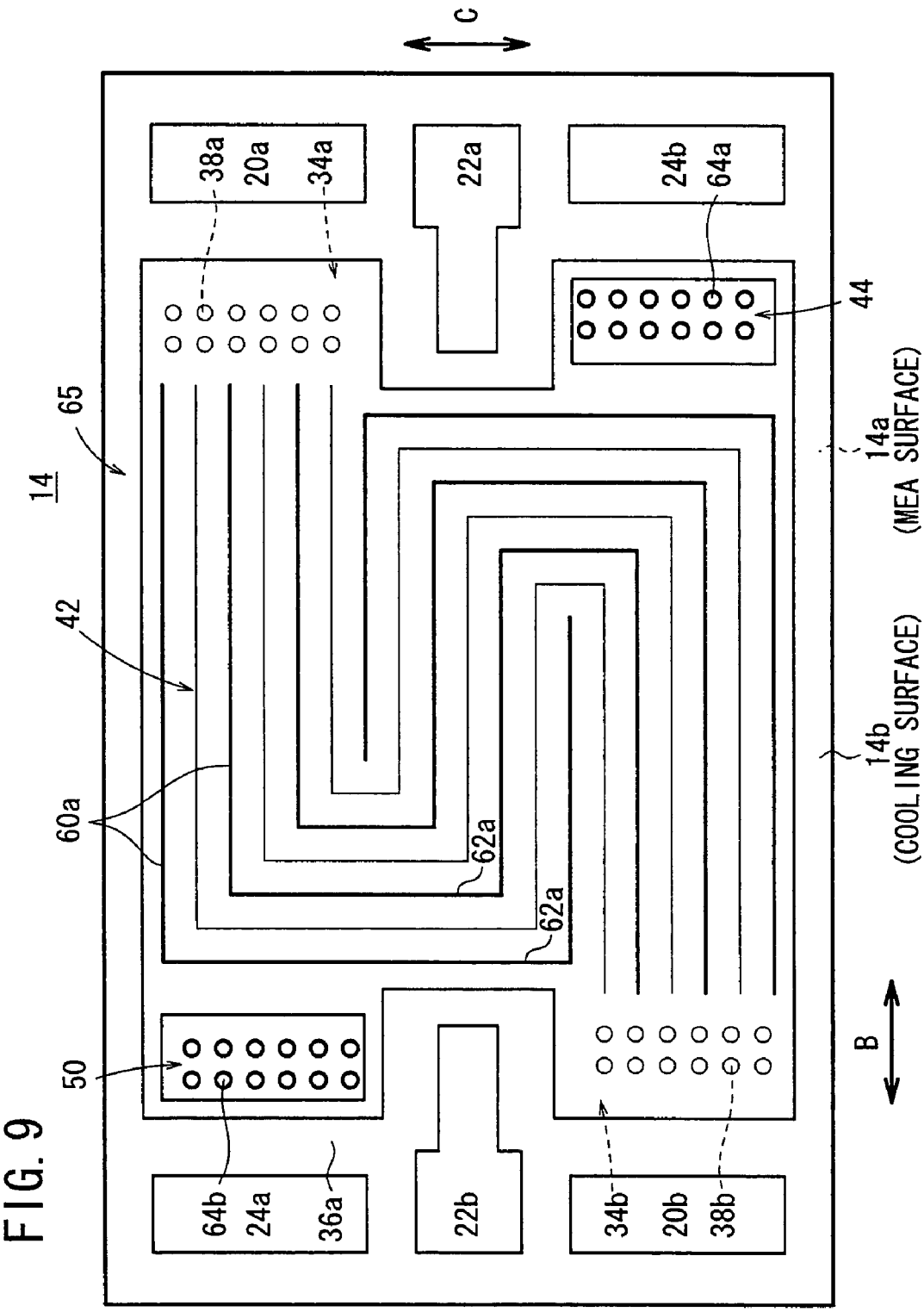
FIG. 9 is a view showing the other surface of the first metal plate.

As shown in FIG. 9, part of the coolant flow field 42 is formed on the surface (cooling surface) 14b of the first metal plate 14. Protrusions on the surface 14b formed by the grooves of the oxygen-containing gas flow field 32 on the surface 14a are not shown for ease of understanding. Likewise, in FIG. 10, protrusions on the surface 16a of the second metal plate 16 formed by the grooves of the fuel gas flow field 68 on the surface 16b are not shown.

The inlet buffer 44 connected to the coolant supply passage 22a and the outlet buffer 50 connected to the coolant discharge passage 22b are provided on the surface 14b. The inlet buffer 44 and the outlet buffer 50 are formed by fabricating the surface 14b to expand toward the surface 14a. In the inlet buffer 44 and the outlet buffer 50, a plurality of bosses 64a, 64b protrude from the surface 14b toward the second metal plate 16 (see FIG. 4). On the surface 14b, grooves 60a, 62a as part of the straight flow grooves 60, 62 extend in the directions indicated by the arrows B and C over predetermined distances.

A first seal member 65 is formed integrally on the surfaces 14a, 14b of the first metal plate 14, e.g., by injection molding or the like, to cover (sandwich) the outer edge of the first metal plate 14. The first seal member 65 is a planar seal. On the surface 14a, as shown in FIG. 8, a line seal 65a is provided around the oxygen-containing gas supply passage 20a, the oxygen-containing gas discharge passage 20b, and the oxygen-containing gas flow field 32 for preventing leakage of the oxygen-containing gas. Part of the line seal 65a functions as a partition wall forming the connection grooves 36a, 36b.

Figure 10:
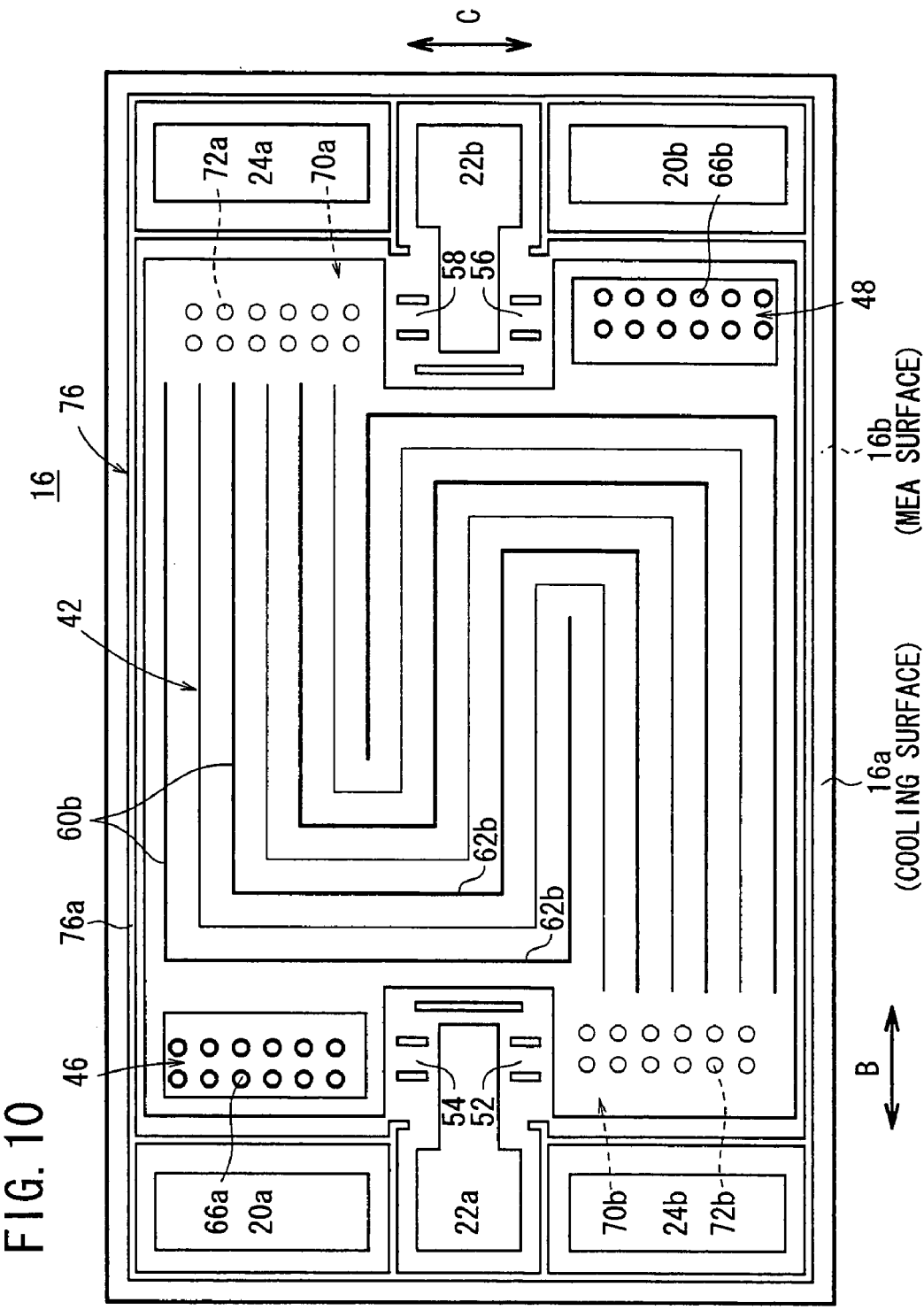
FIG. 10 is a view showing one surface of a second metal plate of the fuel cell.

As shown in FIG. 10, the inlet buffer 46 and the outlet buffer 48 are provided on the surface (cooling surface) 16a of the second metal plate 16. The inlet buffer 46 and the outlet buffer 48 are formed by fabricating the surface 16a to expand toward the surface 16b. In the inlet buffer 46 and the outlet buffer 48, a plurality of bosses 66a, 66b protrude from the surface 16a toward the first metal plate 14 (see FIG. 5).

On the surface 16a, grooves 60b, 62b as part of the straight flow grooves 60, 62 extend in the directions indicated by the arrows B and C over predetermined distances. In the coolant flow field 42, at part of the straight flow grooves 60 extending in the direction indicated by the arrow B, the grooves 60a through 60b face each other to form a main flow field. The sectional area of the main flow field in the coolant flow field 42 is twice as large as the sectional area of the other part of the coolant flow field 42 (see FIGS. 2 and 3).

Figure 11:
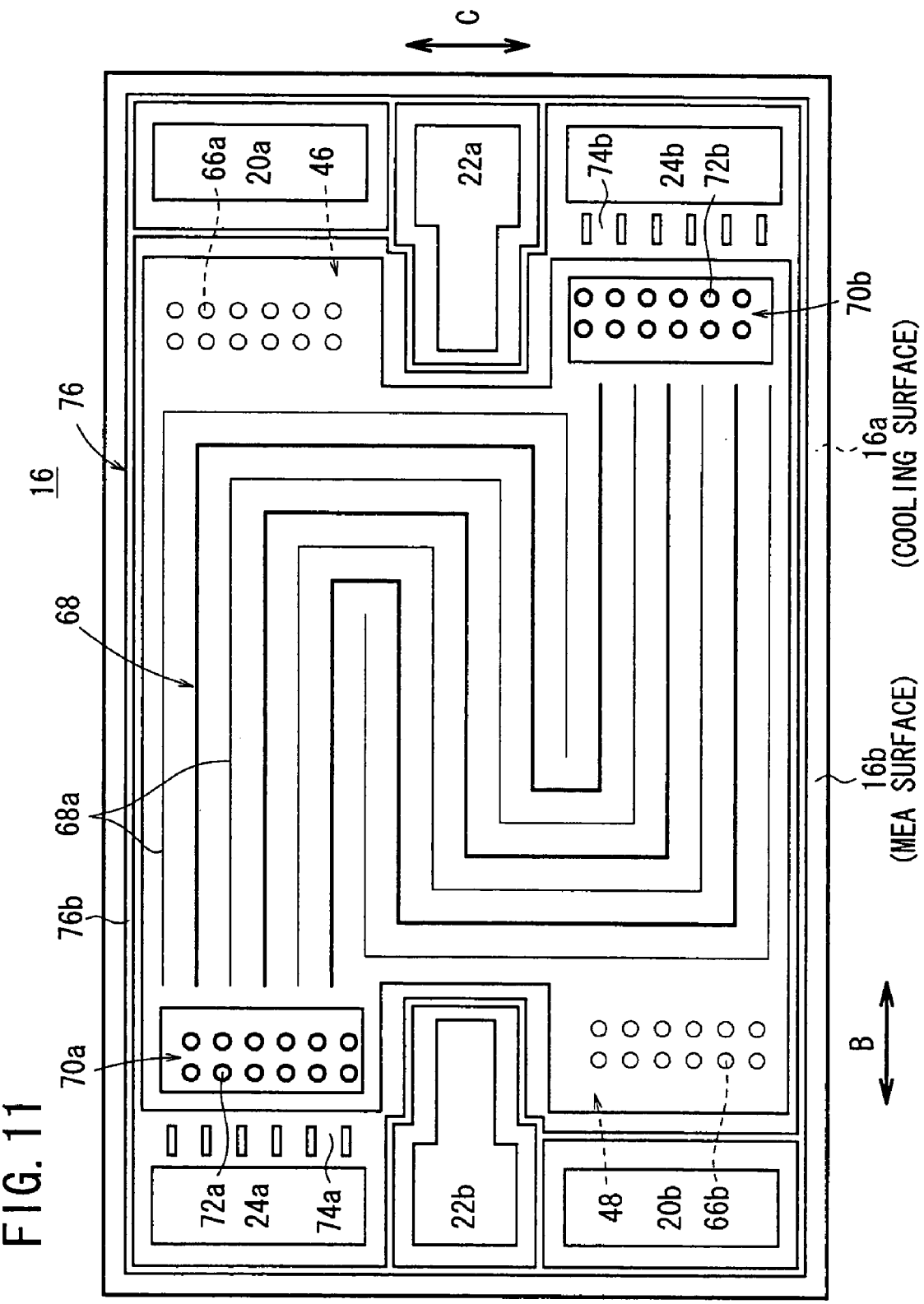
FIG. 11 is a view showing the other surface of the second metal plate.
Figure 12:
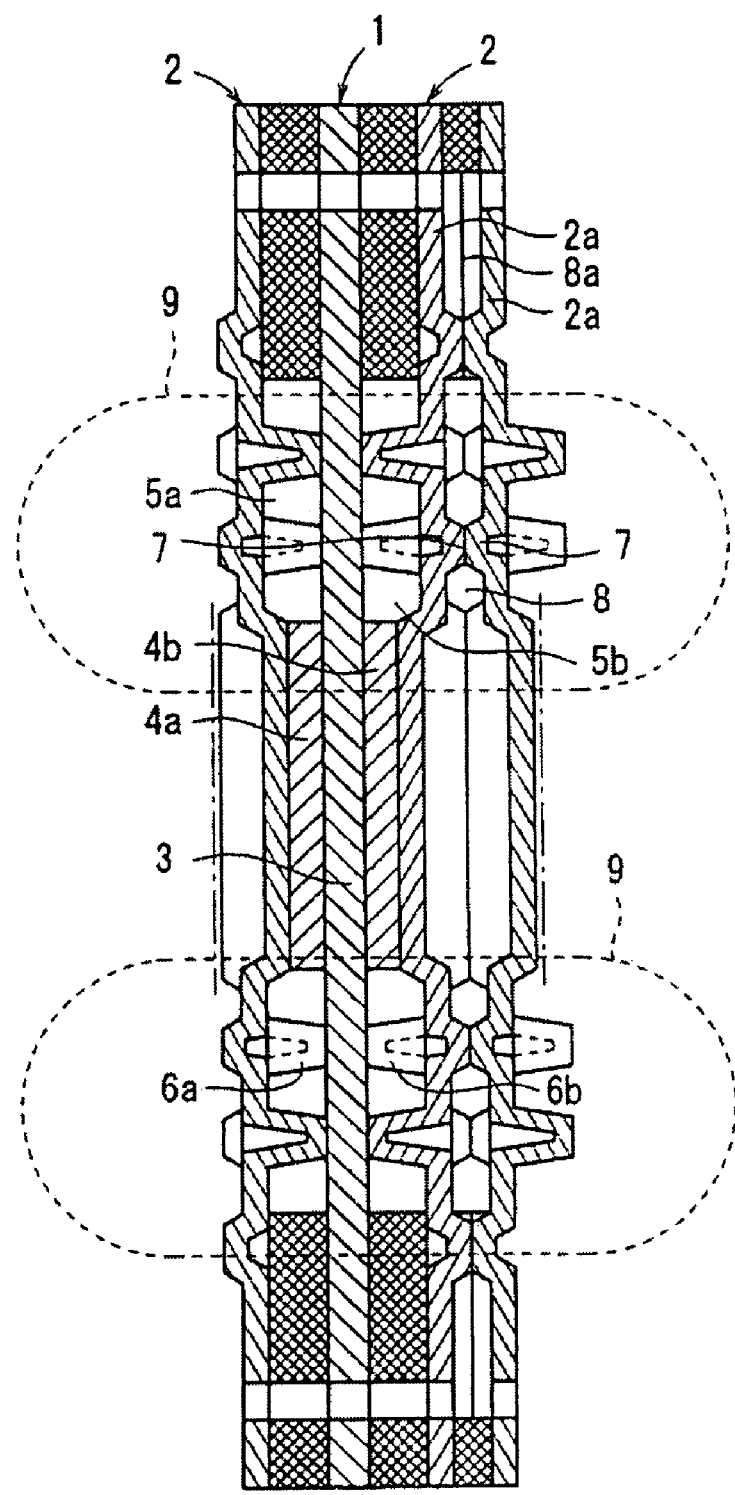
FIG. 12 is a cross sectional view showing a fuel cell disclosed in Japanese Laid-Open Patent Publication No. 8-180883.

As shown in FIG. 11, the second metal plate 16 has a fuel gas flow field 68 on its surface (MEA surface) 16b facing the membrane electrode assembly 12. The fuel gas flow field 68 is connected to the fuel gas supply passage 24a at one end through an inlet buffer (fuel gas buffer) 70a provided near the fuel gas supply passage 24a, and connected to the fuel gas discharge passage 24b at the other end through an outlet buffer (fuel gas buffer) 70b provided near the fuel gas discharge passage 24b.

In the inlet buffer 70a and the outlet buffer 70b, the surface 16a is expanded toward the surface 16b. In the inlet buffer 70a and the outlet buffer 70b, a plurality of bosses 72a, 72b protrude from the surface 16a toward the anode 28 of the membrane electrode assembly 12. The inlet buffer 70a is connected to the fuel gas supply passage 24a through a plurality of connection grooves 74a, and the outlet buffer 70b is connected to the fuel gas discharge passage 24b through a plurality of connection grooves 74b.

The fuel gas flow field 68 comprises a plurality of fuel gas flow grooves 68a extending in a serpentine pattern for allowing the fuel gas to flow back and forth in the direction indicated by the arrow B, and flow in the direction indicated by the arrow C. Specifically, the fuel gas flow grooves 68a are serpentine grooves having two turn regions, and three straight regions extending in the direction indicated by the arrow B.

A second seal member 76 is formed integrally on the surfaces 16a, 16b of the second metal plate 16, e.g., by injection molding or the like, to cover (sandwich) the outer edge of the second metal plate 16. The second seal member 76 is a planar seal. On the surface 16a, as shown in FIG. 10, a line seal 76a is provided around the coolant supply passage 22a, the coolant discharge passage 22b, and the coolant flow field 42 for preventing leakage of the coolant. On the surface 16b, as shown in FIG. 11, a line seal 76b is provided around the fuel gas supply passage 24a, the fuel gas discharge passage 24b, and the fuel gas flow field 68 for preventing leakage of the fuel gas.

Part of the line seal 76a functions as a partition wall forming the inlet flow grooves 52, 54 and the outlet flow grooves 56, 58 (see FIG. 10). Part of the line seal 76b functions as a partition wall forming connection grooves 74a, 74b (see FIG. 11).

When the first and second metal plates 14, 16 are stacked together, the inlet buffer 44 and the outlet buffer 50 of the first metal plate 14 are overlapped with the outlet buffer 70b and the inlet buffer 70a of the second metal plate 16 in the stacking direction, and the inlet buffer 34a and the outlet buffer 34b of the first metal plate 14 are overlapped with the inlet buffer 46 and the outlet buffer 48 of the second metal plate 16.

Figure 4:
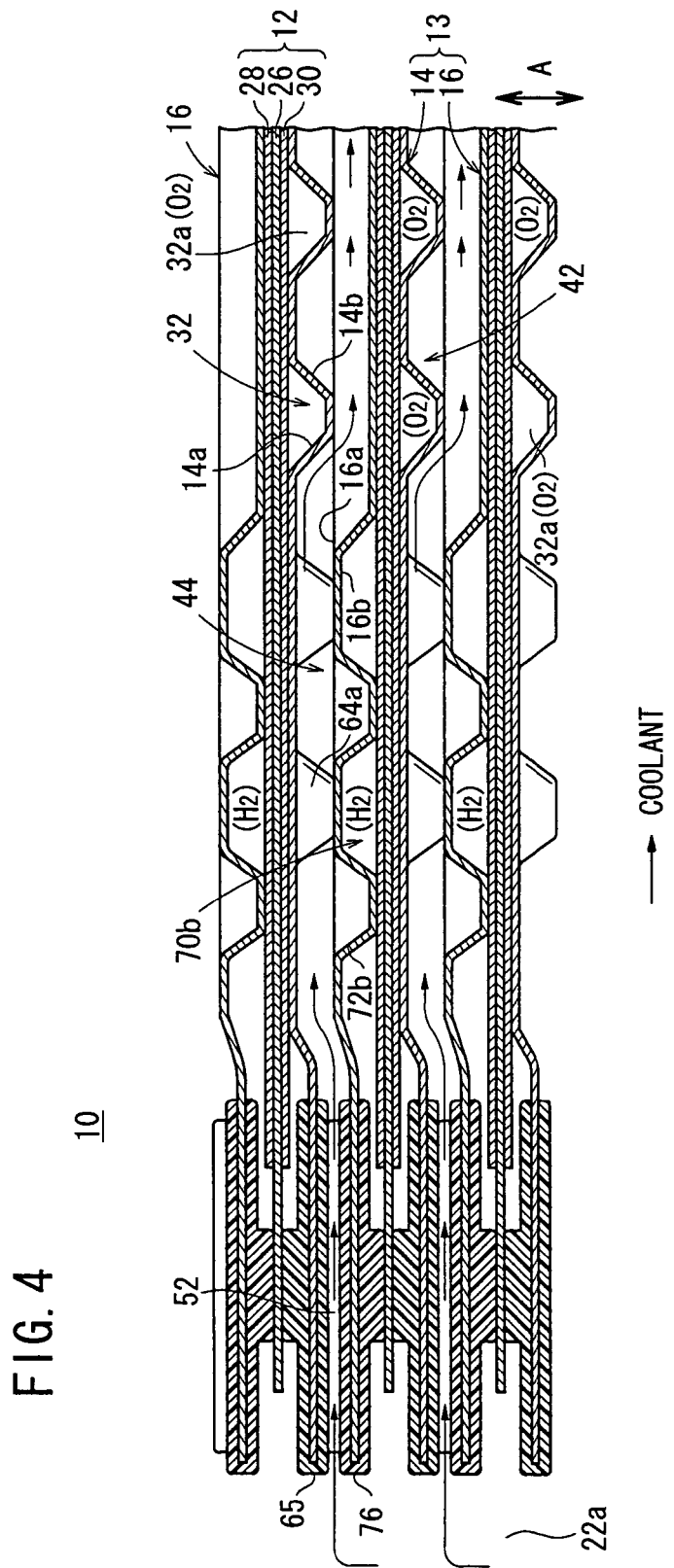
FIG. 4 is a cross sectional view of the fuel cell taken along a line IV-IV in FIG. 3.
Figure 6:
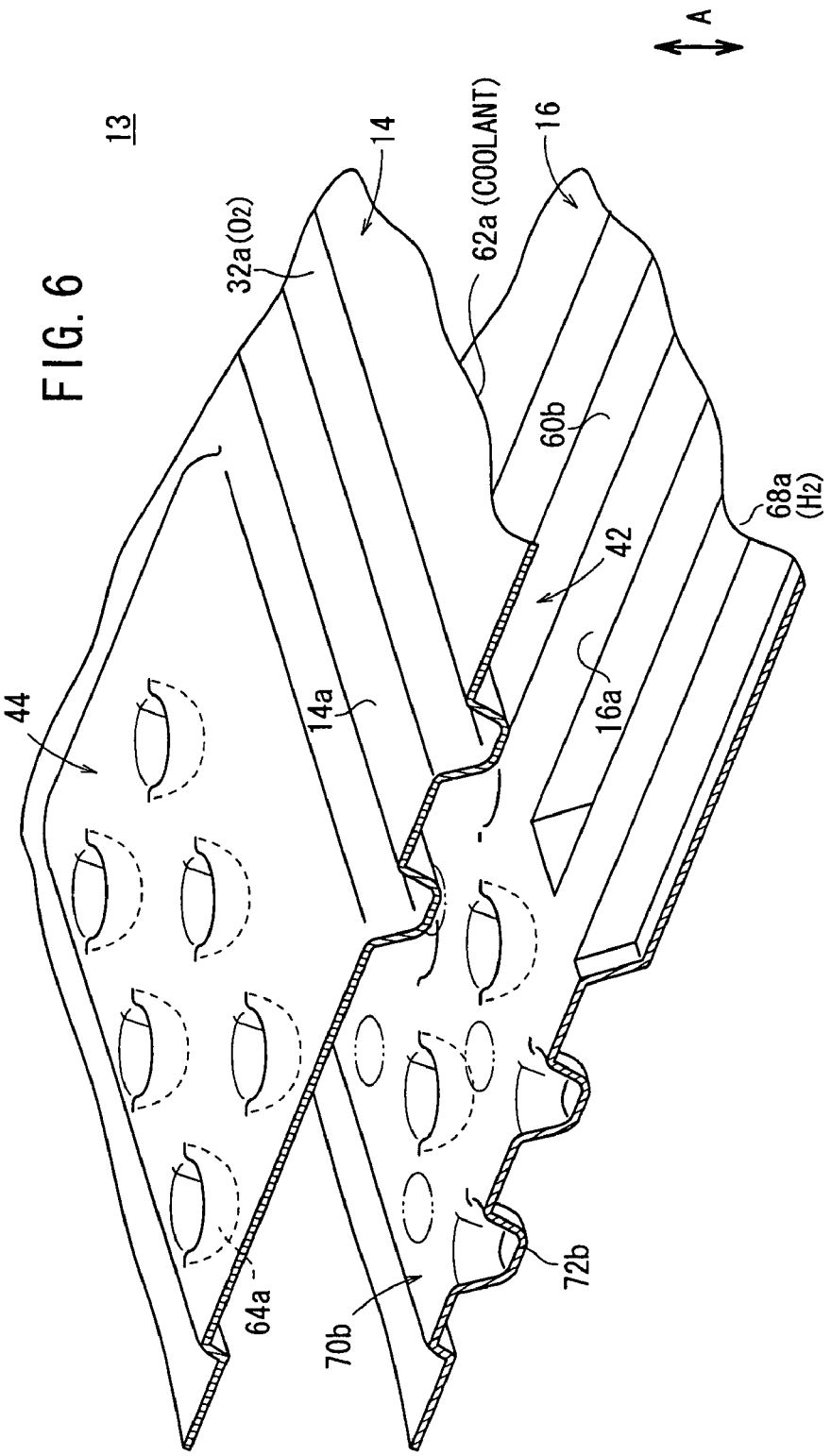
FIG. 6 is a partial cross sectional perspective view of an inlet buffer and an outlet buffer shown in FIG. 4

As shown in FIGS. 3, 4, and 6, in the inlet buffer 44 and the outlet buffer 70b, the bosses 64a protruding toward the second metal plate 16 and the bosses 72b protruding toward the anode 28 are not overlapped with each other in the stacking direction. The bosses 64a contact the surface 16a of the second metal plate 16 for supporting the surface 16a, and the bosses 72b contact the anode 28.

Figure 5:
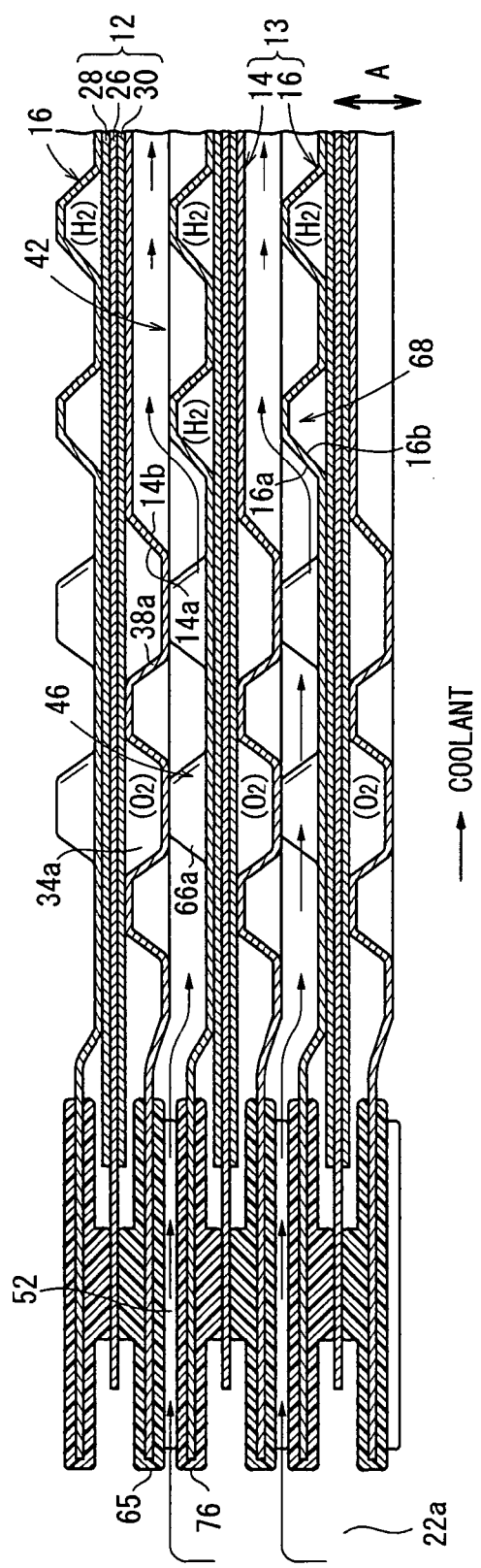
FIG. 5 is a cross sectional view of the fuel cell taken along a line V-V in FIG. 3.
Figure 7:
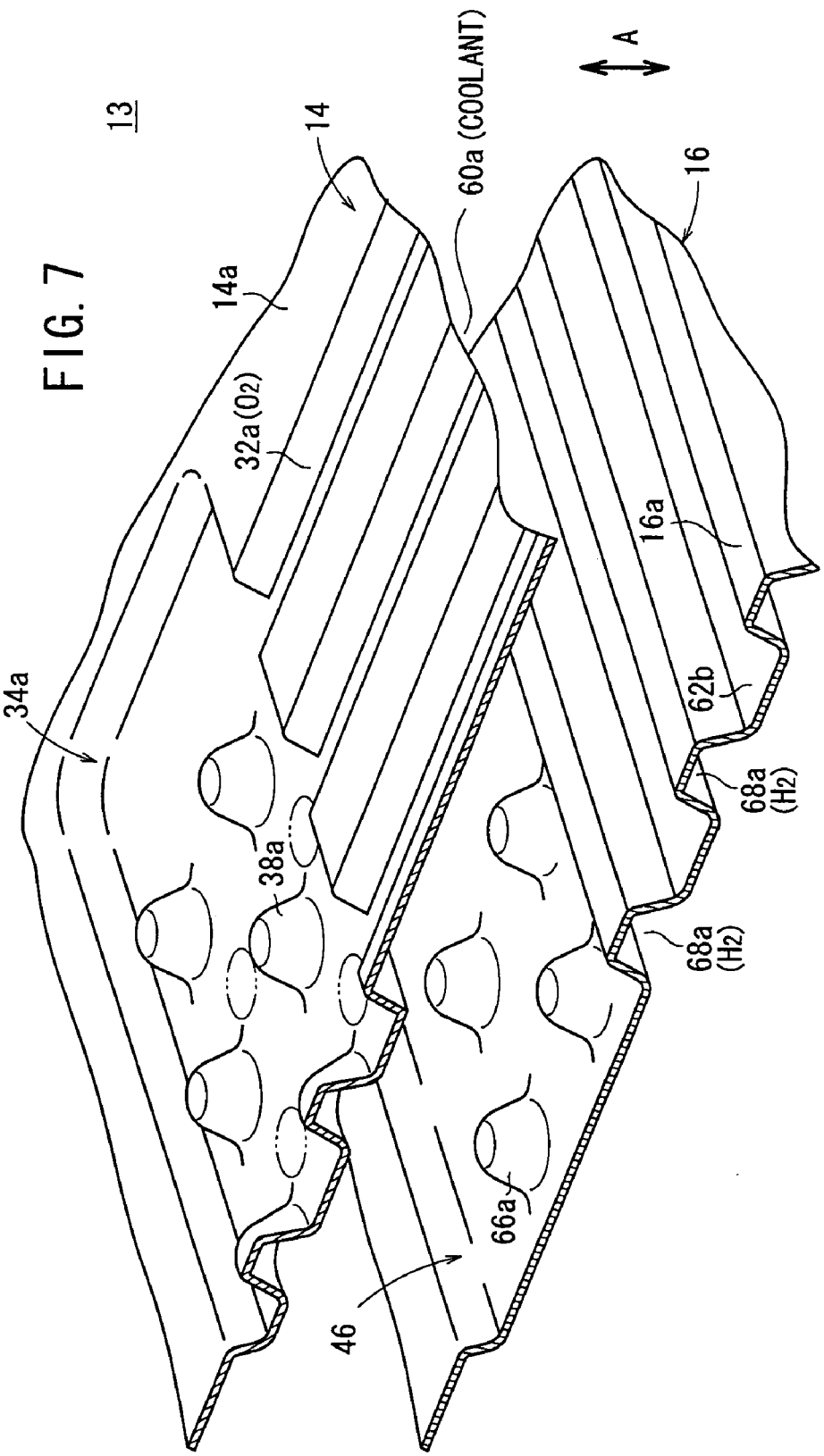
FIG. 7 is a partial cross sectional view of one inlet buffer and the other inlet buffer shown in FIG. 5.

Likewise, as shown in FIGS. 3, 5, and 7, in the inlet buffer 46 and the inlet buffer 34a, the bosses 66a and the bosses 38a are not overlapped with each other in the stacking direction. The bosses 66a contact the surface 14b of the first metal plate 14 for supporting the surface 14b, and the bosses 38a contact the cathode 30.

As shown in FIG. 3, in the outlet buffer 48 and the outlet buffer 34b, the bosses 66b and the bosses 38b are not overlapped with each other in the stacking direction, and in the outlet buffer 50 and the inlet buffer 70a, the bosses 64b and the bosses 72a are not overlapped with each other in the stacking direction, Next, operation of the fuel cell 10 will be described below.

As shown in FIG. 1, an oxygen-containing gas is supplied to the oxygen-containing gas supply passage 20a, and a fuel gas such as a hydrogen-containing gas is supplied to the fuel gas supply passage 24a. Further, a coolant such as pure water, an ethylene glycol, or an oil is supplied to the coolant supply passage 22a.

The oxygen-containing gas flows from the oxygen-containing gas supply passage 20a into the oxygen-containing gas flow field 32 of the first metal plate 14. As shown in FIG. 8, after the oxygen-containing gas temporarily flows into the inlet buffer 34a, the oxygen-containing gas is distributed into the oxygen-containing gas flow grooves 32a. Thus, the oxygen-containing gas flows along the respective oxygen-containing gas flow grooves 32a in a serpentine pattern along the cathode 30 of the membrane electrode assembly 12.

The fuel gas flows from the fuel gas supply passage 24a into the fuel gas flow field 68 of the second metal plate 16. As shown in FIG. 11, after the fuel gas temporarily flows into the inlet buffer 70a, the fuel gas is distributed into the fuel gas flow grooves 68a. Thus, the fuel gas flows along the respective fuel gas flow grooves 68a in a serpentine pattern along the anode 28 of the membrane electrode assembly 12.

Thus, in each of the membrane electrode assemblies 12, the oxygen-containing gas supplied to the cathode 30, and the fuel gas supplied to the anode 28 are consumed in the electrochemical reactions at catalyst layers of the cathode 30 and the anode 28 for generating electricity.

Then, after the oxygen-containing gas is consumed at the cathode 30, the oxygen-containing gas is discharged from the outlet buffer 34b into the oxygen-containing gas discharge passage 20b (see FIG. 8). Likewise, after the fuel gas is consumed at the anode 28, the fuel gas is discharged from the outlet buffer 70b into the fuel gas discharge passage 24b (see FIG. 11).

The coolant supplied to the coolant supply passage 22a flows into the coolant flow field 42 between the first and second metal plates 14, 16. In the coolant flow field 42, as shown in FIGS. 2 to 5, the coolant from the coolant supply passage 22a temporarily flows into the inlet buffers 44, 46 through the inlet flow grooves 52, 54 extending in the direction indicated by the arrow C.

As shown in FIGS. 2 and 3, after the coolant flows into the inlet buffers 44, 46, the coolant is distributed into the straight flow grooves, and flows horizontally in the direction indicated by the arrow B and vertically in the direction indicated by the arrow C. Therefore, the coolant is supplied over the entire power generation surface of the membrane electrode assembly 12. Then, the coolant flows temporarily into the outlet buffers 48, 50, and is discharged into the coolant discharge passage 22b.

In the embodiment of the present invention, when the first and second metal plates 14, 16 are stacked together, for example, the inlet buffer 44 of the first metal plate 14 and the outlet buffer 70b of the second metal plate 16 are overlapped with each other in the stacking direction. At this time, the bosses 64a in the inlet buffer 44 and the bosses 72b in the outlet buffer 70b are not overlapped with each other in the stacking direction (see FIGS. 3, 4, and 6).

Therefore, as shown in FIG. 4, in the outlet buffer 70b, the bosses 72b contact the anode 28 of the membrane electrode assembly 12 to achieve the desired height of the fuel gas flow field 68. In the inlet buffer 44, the bosses 64a are not overlapped with the bosses 72b, i.e., the bosses. 64a contact the planar portion of the surface 16a of the second metal plate 16 for achieving the desired height of the coolant flow field 42. Therefore, the consumed fuel gas flows smoothly along the outlet buffer 70b, and the coolant flows along smoothly along the inlet buffer 44.

Further, since the bosses 72b, 64a are not overlapped with each other in the stacking direction, the bosses 72b support the anode 28, and the bosses 64a support the planar portion (separator surface) of the surface 16a of the second metal plate 16. Thus, the load is suitably transmitted in the staking direction indicated by the arrow A through the bosses 72b, 64a. Accordingly, the desired tightening load is reliably applied to the fuel cell 10 advantageously.

In the inlet buffer 46 and the inlet buffer 34a which are overlapped with each other in the stacking direction, in the outlet buffer 48 and the outlet buffer 34b which are overlapped with each other in the stacking direction, and in the outlet buffer 50 and in the inlet buffer 70a which are overlapped with each other in the stacking direction, the same advantages can be obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
an electrolyte electrode assembly having a pair of electrodes and an electrolyte interposed between the electrodes;
separators stacked with the electrolyte electrode assembly, each separator having a first and second metal plate;
a reactant gas supply passage and a reactant gas discharge passage extended through the fuel cell in the stacking direction;
a reactant gas inlet buffer on respective surfaces of the first and second metal plates facing a respective one of the electrodes, wherein the reactant gas inlet buffer has bosses;
a reactant gas outlet buffer on the respective surfaces of the first and second metal plates facing a respective one of the electrodes, wherein the reactant gas outlet buffer has bosses;
a reactant gas flow field between each reactant gas inlet buffer and corresponding reactant gas outlet buffer;
a coolant inlet buffer on respective surfaces of the first and second metal plates that are opposite the reactant gas inlet and outlet buffers, wherein the coolant inlet buffer has bosses;
a coolant outlet buffer on respective surfaces of the first and second metal plates that are opposite the reactant gas inlet and outlet buffers, wherein the coolant outlet buffer has bosses;
a coolant flow field between each coolant inlet buffer and corresponding coolant outlet buffer; and
the coolant inlet buffer and the coolant outlet buffer including bosses on each of the first and second metal plates facing away from respective electrodes,
wherein each coolant inlet buffer and each coolant outlet buffer overlaps at least one of the reactant gas inlet buffers or reactant gas outlet buffers in the stacking direction, and wherein the bosses of overlapping buffers do not overlap each other in the stacking direction.

2. The fuel cell of claim 1 wherein the reactant gas flow fields and the coolant flow fields comprise flow grooves formed in the first or second metal plates.

3. The fuel cell of claim 2 wherein the reactant gas flow fields and the coolant flow fields are substantially free of bosses.

4. A fuel cell according to claim 1, wherein said reactant gas supply passage comprises an oxygen-containing gas supply passage and a fuel gas supply passage;
said reactant gas discharge passage comprises an oxygen-containing gas discharge passage and a fuel gas discharge passage;
said reactant gas flow field comprises an oxygen-containing gas flow field provided on said first metal plate for supplying an oxygen-containing gas along a power generation surface of a cathode as one of said electrodes, and a fuel gas flow field provided on said second metal plate for supplying a fuel gas along a power generation surface of an anode as the other of said electrodes;
said reactant gas inlet buffer comprises an oxygen-containing gas inlet buffer and a fuel gas inlet buffer, and when said first metal plate and said second metal plate are stacked together, said oxygen-containing gas inlet buffer and said fuel gas inlet buffer are provided in planes of different positions in the stacking direction; and
said reactant gas outlet buffer comprises an oxygen-containing gas outlet buffer and a fuel gas outlet buffer, and when said first metal plate and said second metal plate are stacked together, said oxygen-containing gas outlet buffer and said fuel gas outlet buffer are provided in planes of different positions in the stacking direction.

5. A fuel cell according to claim 4, wherein said coolant inlet buffer comprises a first inlet buffer connected to a coolant supply passage and said coolant flow field on said first metal plate, and a second inlet buffer connected to said coolant supply passage and said coolant flow field on said second metal plate;
said coolant outlet buffer comprises a first outlet buffer connected to a coolant discharge passage and said coolant flow field on said first metal plate, and a second outlet buffer connected to said coolant discharge passage and said coolant flow field on said second metal plate; and
said first inlet buffer and said first outlet buffer are disposed at positions different from said second inlet buffer and a second outlet buffer.

6. A fuel cell according to claim 5, wherein among six passages comprising said oxygen-containing gas supply passage, said fuel gas supply passage, said coolant supply passage, said oxygen-containing gas discharge passage, said fuel gas discharge passage, and said coolant discharge passage, three passages extend through one end of said separators, and the other three passages extend through an other end of said separators; and
said coolant supply passage and said coolant discharge passage are provided at central positions of opposite ends of said separator.

7. A fuel cell according to claim 6, wherein each of said oxygen-containing gas flow field and said fuel gas flow field comprise serpentine flow grooves.

8. A fuel cell according to claim 1, wherein said reactant gas supply passage and said reactant gas inlet buffer are connected through a plurality of connection grooves, said reactant gas discharge passage and said reactant gas outlet buffer are connected through a plurality of connection grooves, sand coolant supply passage and said coolant inlet buffer are connected through a plurality of connection grooves, and said coolant discharge passage and said coolant outlet buffer are connected through a plurality of connection grooves.

9. A fuel cell according to claim 1, wherein said coolant flow field is partially defined by said first metal plate, and partially defined by said second metal plate.

* * * * *